Oct. 10, 1939.  E. C. WENTZ  2,175,934

ELECTRICAL APPARATUS

Filed June 16, 1937

WITNESSES:
C. J. Weller.
F. E. Hardy.

INVENTOR
Edward C. Wentz.
BY Ezra W. Savage
ATTORNEY

Patented Oct. 10, 1939

2,175,934

UNITED STATES PATENT OFFICE 2,175,934

ELECTRICAL APPARATUS

Edward C. Wentz, Sharpsville, Pa., assignor to Westinghouse Electric & Manufacturing Company, East Pittsburgh, Pa., a corporation of Pennsylvania Application June 16, 1937, Serial No. 148,465

8 Claims. (Cl. 175—358)

My invention relates to instrument transformers, and particularly to portable through-type current transformers that are adapted to be employed to measure the current in a single conductor cable.

The conventional through-type current transformer has a rectangular core forming a window through which the cable or primary conductor extends, and is provided with secondary coils on two opposite legs of the rectangular core. The secondary current output is proportional to the primary current and is measured by an ammeter in the secondary circuit in a well known manner.

In many situations, such as where it is desirable to measure the current in different single conductor cables, it is obviously a great advantage if the transformer can be moved from one cable to another and the core can be readily placed around the cable or primary conductor without disturbing it. This has been accomplished in the past by removing one leg or yoke of the core to enable the transformer core to be placed around the conductor, replacing this leg or yoke after the transformer is in place and holding it in position by a clamp or spring. This provision necessarily introduces two air gaps into the magnetic circuit and the performance of the transformer is correspondingly poor, since the air gaps may vary slightly. The core ends may be ground to a flat surface to exactly fit the surfaces and reduce the gap, but this has proven not to be very effective, possibly because it tends to short circuit the laminations destroying the insulating varnish between them.

An object of this invention is to provide a current transformer, the core of which may be readily placed about a cable and detached therefrom to permit the measurement of the current therein.

A more specific object of my invention is the provision of a current transformer with a rectangular core, having one core member consisting of individually hinged laminations that may be swung to closed or open positions, to provide a core of substantially constant magnetic properties when closed and to permit removal of the core from the primary conductor when open.

Figure 1:
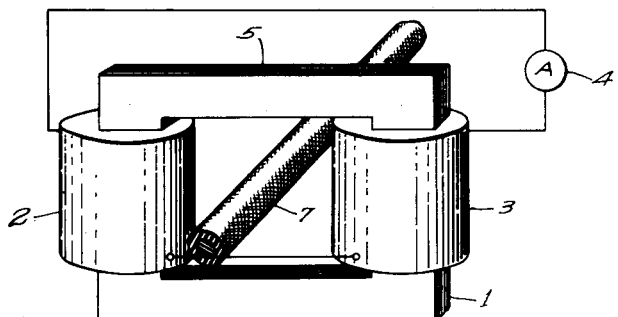
Figures 2, 3:
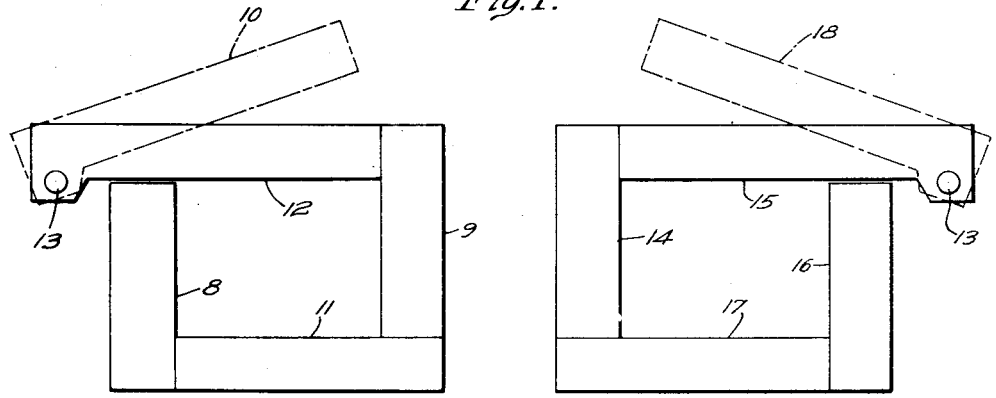
Figure 4:
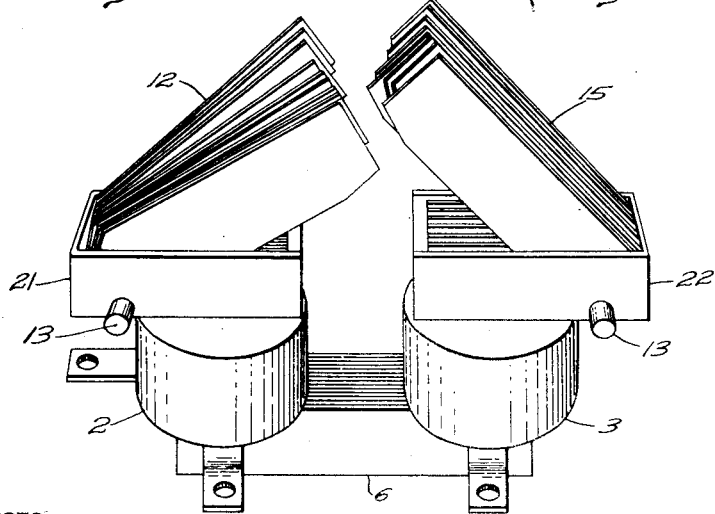

Figure 1 is a perspective view showing a conventional current transformer of the through primary type, Figs. 2 and 3 are side views showing one arrangement of alternate laminations of magnetic material employed in the core of a transformer constructed in accordance with my invention, and Fig. 4 is a perspective view of such a transformer with the hinged laminations swung upwardly to a partially open position.

Referring to Fig. 1, the core 1 is rectangular in form, providing two vertical winding legs for accommodating the secondary winding coils 2 and 3 that are shown connected in series with each other and with an ammeter 4. The winding legs of the core are connected by yokes 5 and 6, the whole core assembly constituting a rectangular structure of magnetic material made up of layers or laminations of magnetic steel and providing a central window or opening through which the primary cable or conductor 7 passes.

Referring to Fig. 2, one layer or core lamination is illustrated which may be constructed from correspondingly shaped punchings 8 and 9, forming the winding legs, joined by punchings 11 and 12, forming the yokes connecting the winding legs. It will be noted that the upper yoke punching 12 is pivoted on a pin 13 near one end about which it may swing from its closed or full line position upwardly to an open or dotted line position 10. The center of the pivot pin 13 about which the punching 12 is swung is in line with the upper end of the punching 8 and inner edge of the punching 12, and the outer end of the hinged lamination 12 abuts adjacent the inner edge of the punching 9 when in its closed position. That is, the upper end of the punching 8 abuts against the inner or lower edge of the punching 12 when in its closed position, and the upper end of the punching 9 aligns with the outer edge of the punching 12 when in its closed position.

The assembly of an adjacent layer of magnetic material, as shown in Fig. 3, corresponds to that shown in Fig. 2, except that it is turned around so that the hinge or pivot pin 13 is at the other end of the same connecting yoke. In Fig. 3, the punchings 14, 15, 16 and 17 correspond, respectively, to the punchings 9, 12, 8 and 11. When the layer of magnetic material disclosed in Fig. 3 is placed upon that disclosed in Fig. 2, so that the windows or central rectangular openings correspond, it will be noted that the ends of the several punchings in the adjacent layers terminate at different parts of the magnetic circuit. For example, the punching 14 extends to the upper edge of the hinged yoke punching 12 and the upper end of the punching 8 terminates at the lower or inner edge of the punching 12. The outer end of the hinged punching 15 of Fig. 3 terminates adjacent the punching 14 and the punching 12 is continuous at this line. The remaining edges of the several punchings are arranged so that the abutting edges of the several punchings in the layer shown in Fig. 3 come at different parts of the magnetic circuit than those in the layer shown in Fig. 2.

The core is made up of alternate layers corresponding to the arrangements disclosed in Figs. 2 and 3, so that the overlapping of adjacent or alternate layers of magnetic material are such that no gap exists at any point in the magnetic circuit. As one of the hinged punchings 12 is moved to its open position, it will move between the adjacent upper ends of the punchings 14 on opposite sides thereof and as the punching 15, that is pivoted at the right of the window as viewed in Fig. 3, is moved upwardly it will move between the upper ends of punchings 9 on opposite sides thereof. The outer end of each hinged punching 12 or 15 abuts against the inner edge of a punching in the same layer 9 or 14, respectively, when in its closed position.

In Fig. 4 a transformer is shown assembled with frame members 21 and 22 attached to the upper ends of the two winding legs for supporting hinge pins 13 upon which the hinged laminations 12 and 15 are pivotally supported, the laminations 12 and 15 being disclosed in the figure as extending upwardly to indicate the manner in which the transformer is removed from a primary winding cable such as shown in Fig. 1, which passes through the window between the secondary windings 2 and 3.

It will be appreciated that in the through-type current transformer core with individually hinged interleaved laminations provided by my invention, all of the joined laminations of the core structure overlap those of the adjacent layers, thus providing a structure that can consistently duplicate a high standard of accuracy of performance when successively applied to different cables, or when removed from and reapplied to, the same cable, since the usual air gaps which are of uncertain effect in the magnetic circuit between different assembling operations of the transformer have been eliminated.

It will be obvious that many modifications of the structure shown and described may be made within the spirit of my invention, and I do not wish to be limited otherwise than by the scope of the appended claims.

I claim as my invention:

1. In a laminated core structure for portable current transformers applicable for use with a through primary conductor, a fixed U-shaped core portion and a core portion comprising a plurality of laminations each bridging from one side to the other of the U-shaped core portion and movable relatively to one another for closing the magnetic circuit, the alternate laminations of said last named core portion being hinged at points adjacent the opposite outer ends of said U-shaped portion.

2. In a core structure for current transformers applicable for use with a through primary conductor, comprising a rectangular core structure having two oppositely disposed winding legs of laminated magnetic material connected by two yokes, the alternate laminations constituting one of said yokes being movable relatively to one another and pivotally mounted adjacent the outer ends of the opposite winding legs.

3. In a current transformer, a core structure having two winding legs connected by two yokes to provide a window adapted to accommodate a through primary conductor, said core structure being formed of layers of laminated steel, the alternate layers of the winding leg portions terminating adjacent the inner and outer boundaries, respectively, of the adjacent yoke portion to provide spaces for the overlap of the alternate laminations of the yoke portions with the laminations of the winding leg portions, the alternate laminations of one of said yoke portions being pivotally mounted at one end on pins positioned beyond the outer boundary of the adjacent core leg.

4. In a current transformer, a core structure having two winding legs connected by two yokes to provide a window adapted to accommodate a through primary conductor, said core structure being formed of layers of laminated steel, the alternate layers of the winding leg portions terminating adjacent the inner and outer boundaries, respectively, of the adjacent yoke portion to provide spaces for the overlap of the alternate laminations of the yoke portions with the laminations of the winding leg portions, each of the laminations forming one of said yoke portions being movable relatively to other laminations and each extending from the inner edge of a winding leg along one side of the window and between laminations on the other winding leg to a hinge pin positioned outside of the window upon which alternate laminations are pivotally mounted.

5. In a current transformer, a core structure having two winding legs connected by two yokes to provide a window adapted to accommodate a through primary conductor, said core structure being formed of layers of laminated steel, the alternate layers of the winding leg portions terminating adjacent the inner and outer boundaries, respectively, of the adjacent yoke portion to provide spaces for the overlap of the alternate laminations of the yoke portions with the laminations of the winding leg portions, hinge pins located on opposite sides of saild core structure on the outside of said window adjacent corresponding ends of said winding leg portions, the alternate laminations forming one of said yoke portions being movable relatively to one another and pivotally mounted on opposite hinge pins and each extending between laminations of the winding leg adjacent its hinge pin to the inner edge of the other winding leg.

6. In a current transformer applicable for use with a through primary conductor, a rectangular core having two oppositely disposed winding legs connected by two oppositely disposed yokes to form a window through which the primary conductor may extend, said core comprising a plurality of layers of magnetic material, the portion of each layer constituting a part of one of said yokes being hinged for movement relative to the other layers of said yoke at a point exterior to said window and in line with the end of the portion of that layer constituting a part of the winding leg adjacent to the hinge point.

7. In a current transformer applicable for use with a through primary conductor, a rectangular core structure having two oppositely disposed winding legs connected by two oppositely disposed yokes to form a window through which the primary conductor may extend, said core comprising a plurality of layers of magnetic material, the portion of each layer constituting a part of one of said yokes being hinged at a point exterior to said window to swing from its magnet circuit closing position separately from the other layers, the portion of each layer constituting a part of the winding leg adjacent said hinged point terminating in abutting relation to the inner edge of said yoke portion, and the portion of each layer constituting a part of the other winding leg extending past the end of said yoke portion to align with the outer edge thereof.

8. In a current transformer applicable for use with a through primary conductor, a rectangular core structure having two oppositely disposed winding legs connected by two oppositely disposed yokes to form a window through which the primary conductor may extend, said core comprising a plurality of layers of magnetic material, the layers constituting one of said yoke portions being movable relatively to one another and individually hinged at one end to be movable between an open and a closed position, the winding leg part of each layer adjacent the hinged end of its associated movable yoke part ending in alignment with the inner edge of said movable yoke part when that part is in its closed position, and the winding leg part remote from the hinged end of said yoke part extending past the end thereof and terminating in alignment with the outer edge of said yoke part when that part is in its closed position, said core being assembled with alternate layers of said magnetic material positioned with the hinged ends of said yoke parts at opposite ends thereof.

EDWARD C. WENTZ.